United States Patent [19]
Fujita et al.

[11] Patent Number: 5,983,632
[45] Date of Patent: Nov. 16, 1999

[54] EXHAUST EMISSION CONTROL APPARATUS FOR A GENERAL-PURPOSE INTERNAL COMBUSTION ENGINE

[75] Inventors: Yasushi Fujita; Hiroshi Kasai; Hiroshi Watanabe; Naoki Ebihara, all of Wako, Japan

[73] Assignee: Honda Giken Kogyo Kabushiki Kaisha, Japan

[21] Appl. No.: 09/130,269

[22] Filed: Aug. 6, 1998

[30] Foreign Application Priority Data

Aug. 7, 1997 [JP] Japan .................................. 9-213579

[51] Int. Cl.$^6$ .................................................. F01N 3/32
[52] U.S. Cl. ................................................................ 60/307
[58] Field of Search ........................................ 60/289, 307

[56] References Cited

U.S. PATENT DOCUMENTS

| | | | |
|---|---|---|---|
| 3,672,172 | 6/1972 | Hammond | 60/307 X |
| 3,712,065 | 1/1973 | Hurst | 60/307 X |
| 3,777,721 | 12/1973 | Sawada | 60/316 X |
| 3,877,229 | 4/1975 | Resler, Jr. | 60/597 |
| 3,885,386 | 5/1975 | Bachmann | 60/307 |
| 3,969,894 | 7/1976 | Bachmann | 60/307 |
| 4,070,828 | 1/1978 | Barres | 60/307 X |
| 4,096,692 | 6/1978 | Nakamura et al. | 60/307 |
| 4,209,981 | 7/1980 | Miyamori et al. | 60/289 X |
| 4,263,783 | 4/1981 | Miura et al. | 60/307 X |
| 4,385,491 | 5/1983 | Sakurai et al. | 60/289 X |
| 5,460,784 | 10/1995 | Gillbrand et al. | 60/289 X |
| 5,755,095 | 5/1998 | Mauer | 60/307 |
| 5,822,976 | 10/1998 | Cockerill | 60/289 X |

FOREIGN PATENT DOCUMENTS

| | | | |
|---|---|---|---|
| 52-22625 | 2/1977 | Japan | 60/289 |
| 52-22626 | 2/1977 | Japan | 60/289 |
| 4325709 | 11/1992 | Japan . | |
| 5113119 | 5/1993 | Japan . | |

Primary Examiner—John E. Ryznic
Attorney, Agent, or Firm—Adams & Wilks

[57] ABSTRACT

An exhaust emission control apparatus for a general-purpose internal combustion engine comprises an exhaust passage allowing passage of an exhaust gas therethrough and having a ternary catalyst, and an air pump for supplying a secondary air to the exhaust passage. The air pump is driven by rotation of a camshaft having a cam for opening and closing an exhaust or intake valve of the internal combustion engine. The drive of the air pump is effected by a pump rocker arm disposed between the cam and a pump shaft of the air pump.

5 Claims, 9 Drawing Sheets

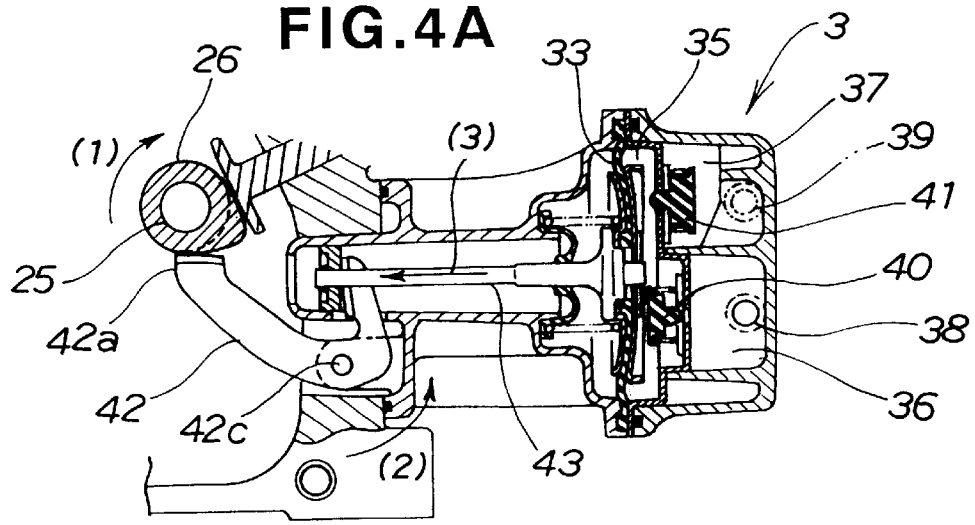
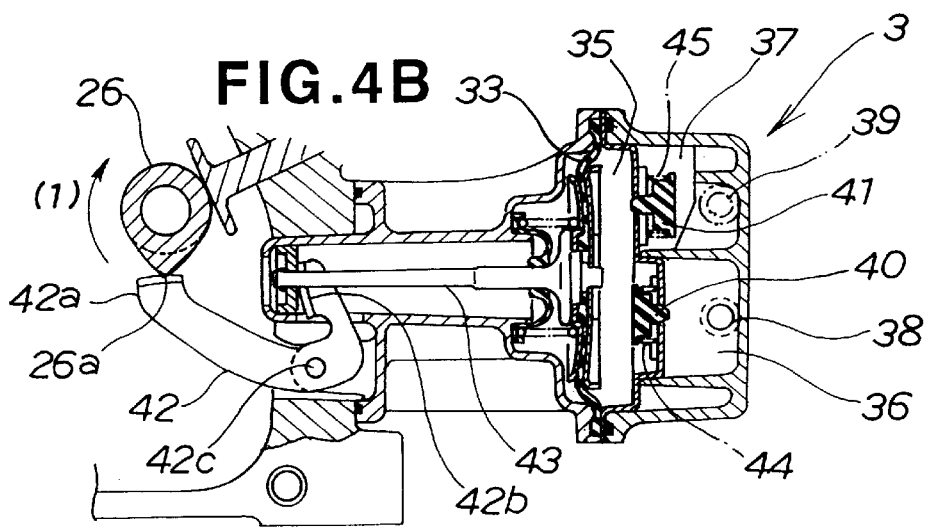
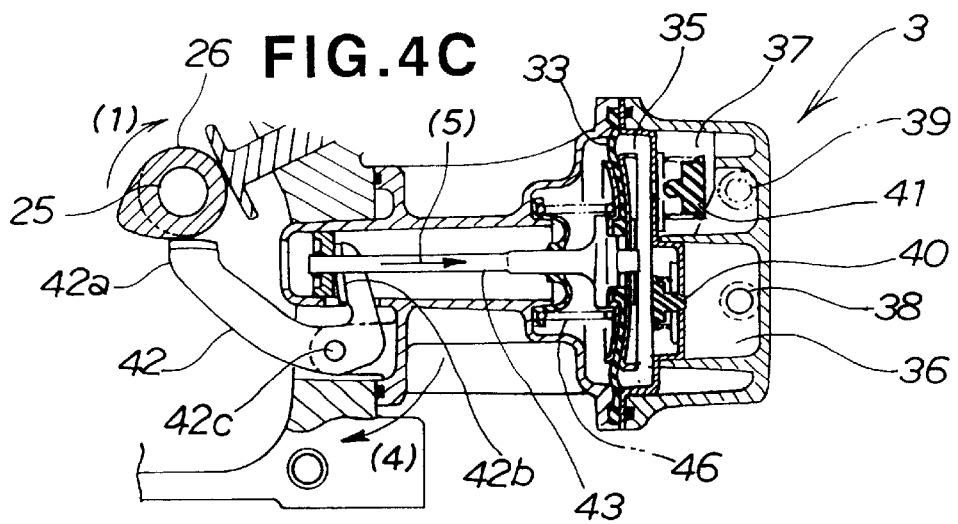

EXHAUST EMISSION CONTROL APPARATUS FOR A GENERAL-PURPOSE INTERNAL COMBUSTION ENGINE

BACKGROUND OF THE INVENTION

1. Field of the Invention

The present invention relates to an exhaust emission control apparatus for controlling an exhaust emission or gas of a general-purpose internal combustion engine by applying a secondary air to a ternary catalyst provided in an exhaust passage of the engine.

2. Description of the Related Art

Technology is known in which for controlling an exhaust emission of a general-purpose internal combustion engine, a secondary air is applied to a ternary catalyst provided in an exhaust passage of the engine to thereby improve the rate of oxidization of pollutants in the exhaust emission.

Such known technology is disclosed in, for example, Japanese Patent Laid-Open Publication Nos. HEI-4-325709 entitled "METHOD AND APPARATUS FOR CONTROLLING AN EXHAUST EMISSION OF AN INTERNAL COMBUSTION ENGINE" and HEI-5-113119 entitled "GENERAL-PURPOSE INTERNAL COMBUSTION ENGINE HAVING A SECONDARY AIR SUPPLY DEVICE".

The exhaust emission control apparatus disclosed in Japanese Patent Laid-Open Publication No. HEI-4-325709 has a catalytic member disposed closely to an outlet of a muffler and is arranged such that the atmosphere is caused to come into a downstream portion of the catalytic member by exhaust pulsation, whereby the oxidization reaction of the exhaust emission at the downstream portion of the catalytic member is promoted by the backflown air.

However, the disclosed apparatus has a drawback in that the amount of the backflown air is small and hence the apparatus can hardly pass a required high exhaust gas control value.

In order to achieve the pulsation more effectively, the general-purpose internal engine disclosed in Japanese Patent Laid-Open Publication No. HEI 5-113119 has a tailpipe which is longer than an exhaust pipe connected to a muffler with exhaust gas control capability and connected at an upstream end thereof to the muffler.

However, because the length of the tailpipe of the disclosed general-purpose internal combustion engine is set to provide optimal pulsation at a rated speed, high exhaust gas control efficiency can hardly be achieved in the engine operated at a wide range of engine speeds. Further, it is undesirable to have such a long tailpipe in the general-purpose internal combustion engine which is required to be compact.

Consequently, there is a demand for the provision of an exhaust emission control apparatus for a general-purpose internal combustion engine, which apparatus is compact and capable of supplying a sufficient secondary air and of coping with a wide range of engine speeds.

SUMMARY OF THE INVENTION

According to an aspect of the present invention, there is provided an exhaust emission control apparatus for a general-purpose internal combustion engine, which comprises an exhaust passage for guiding an exhaust emission produced by operation of the internal combustion engine externally thereof, a ternary catalyst provided in the exhaust passage, an air pump for forcibly supplying the ternary catalyst with a secondary air for controlling the exhaust emission, and a drive mechanism for driving the air pump in synchronism with opening and closing actions of an exhaust valve of the internal combustion engine.

Preferably, the drive mechanism includes a camshaft for driving the exhaust valve and, more particularly, a pump rocker arm having an end abutted with a cam provided on the camshaft for opening and closing the exhaust valve and an opposite end connected to one end of a pump shaft of the air pump, the pump rocker arm being pivotable about a pin by rotation of the cam. By pivotal movement of the pump rocker arm, the pump shaft is reciprocated.

In another preferred form, the drive mechanism includes a cam gear having a camshaft for actuating the exhaust valve. More specifically, it includes a pump driven gear meshing with the cam gear so that a pump shaft mounted on the pump driven gear can be rotated by the rotation of the cam gear.

Since the exhaust emission control apparatus is arranged such that the secondary air is forcibly supplied by the air pump to the ternary catalyst provided in the exhaust passage, the ternary catalyst is fed with a sufficient air, whereby improved exhaust emission control is effected throughout a wide range of engine speeds of the internal combustion engine.

Further, in the exhaust emission control apparatus according to the present invention, since the air pump is driven by the camshaft for opening and closing an intake or exhaust valve or by the cam gear for rotating the camshaft, it becomes possible to opportunely supply the secondary air in response to the opening and closing action of the intake or exhaust valve, without providing a control system for controlling the drive of the air pump.

BRIEF DESCRIPTION OF THE DRAWINGS

Certain preferred embodiments of the present invention will hereinafter be described in detail, by way of example only, with reference to the accompanying drawings, in which:

FIGS. 4A, 4B and 4C show how an air pump of the internal combustion engine operates;

DETAILED DESCRIPTION OF THE PREFERRED EMBODIMENTS

The following description is merely exemplary in nature and is in no way intended to limit the invention or its application or uses.

Figure 1:
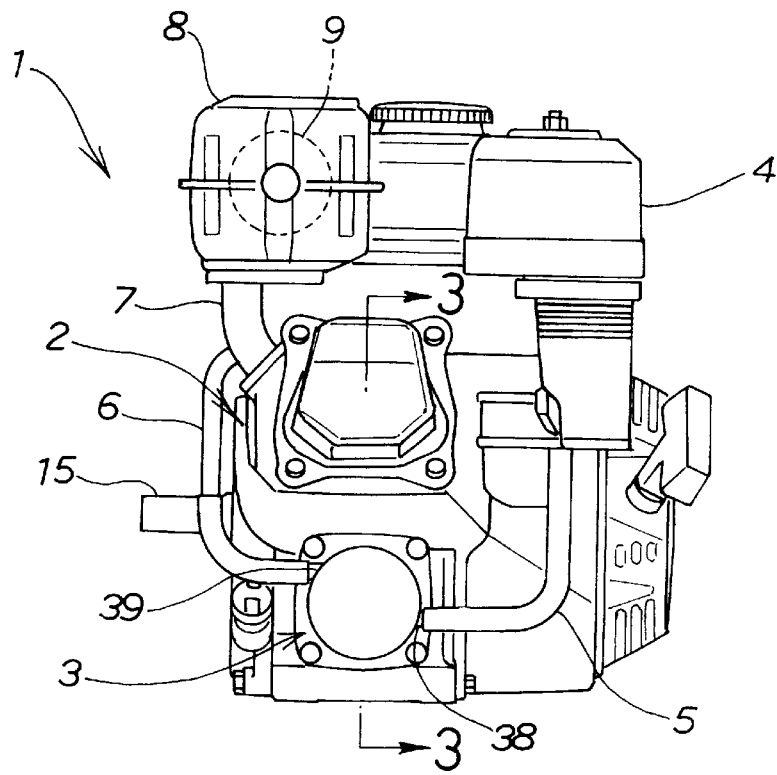
FIG. 1 is a front elevational view of a general-purpose internal combustion engine according to a first embodiment of the present invention.

Referring to FIG. 1, a general-purpose internal combustion engine 1 comprises a cylinder 2 positioned centrally of the figure, an air pump 3 disposed below the cylinder 2, an air cleaner 4 located at an upper right portion of the figure, a secondary air intake pipe 5 extending from a lower part of the air cleaner 4 to the air pump 3, a secondary air supply pipe 6 with its one end extending from a left side of the air pump 3, an exhaust pipe 7 with its one end connected to an opposite end of the secondary air supply pipe 6 and a muffler 8 connected to an opposite end of the exhaust pipe 7. The muffler 8 includes a ternary catalyst 9 provided internally thereof.

Figure 2:
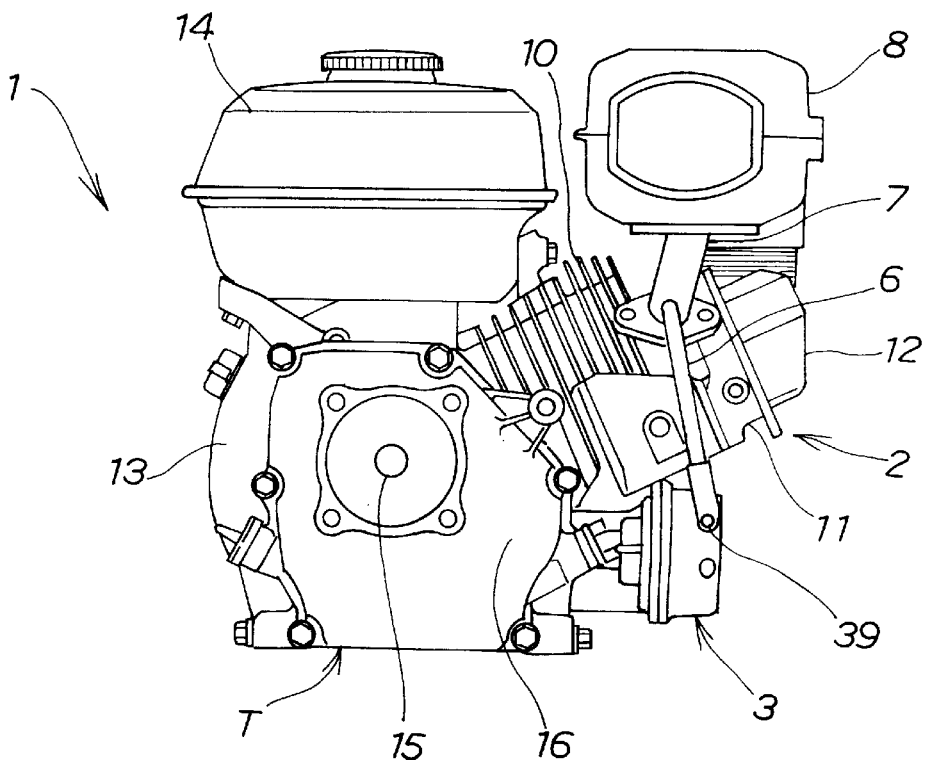
FIG. 2 is a side view of the general-purpose internal combustion engine shown in FIG. 1.

Turning next to FIG. 2, the cylinder 2 is inclined to the upper right direction in this figure (hereinafter referred to as an inclined cylinder 2). The inclined cylinder 2 comprises a cylinder block 10, a cylinder head 11 and a cylinder head cover 12. The cylinder block 10 is formed integrally with a crankcase 13. The general-purpose internal combustion engine 1 is provided with a fuel tank 14 disposed at an upper part thereof, a crankshaft 15 and a crankcase cover 16 which are provided centrally thereof.

Figure 3:
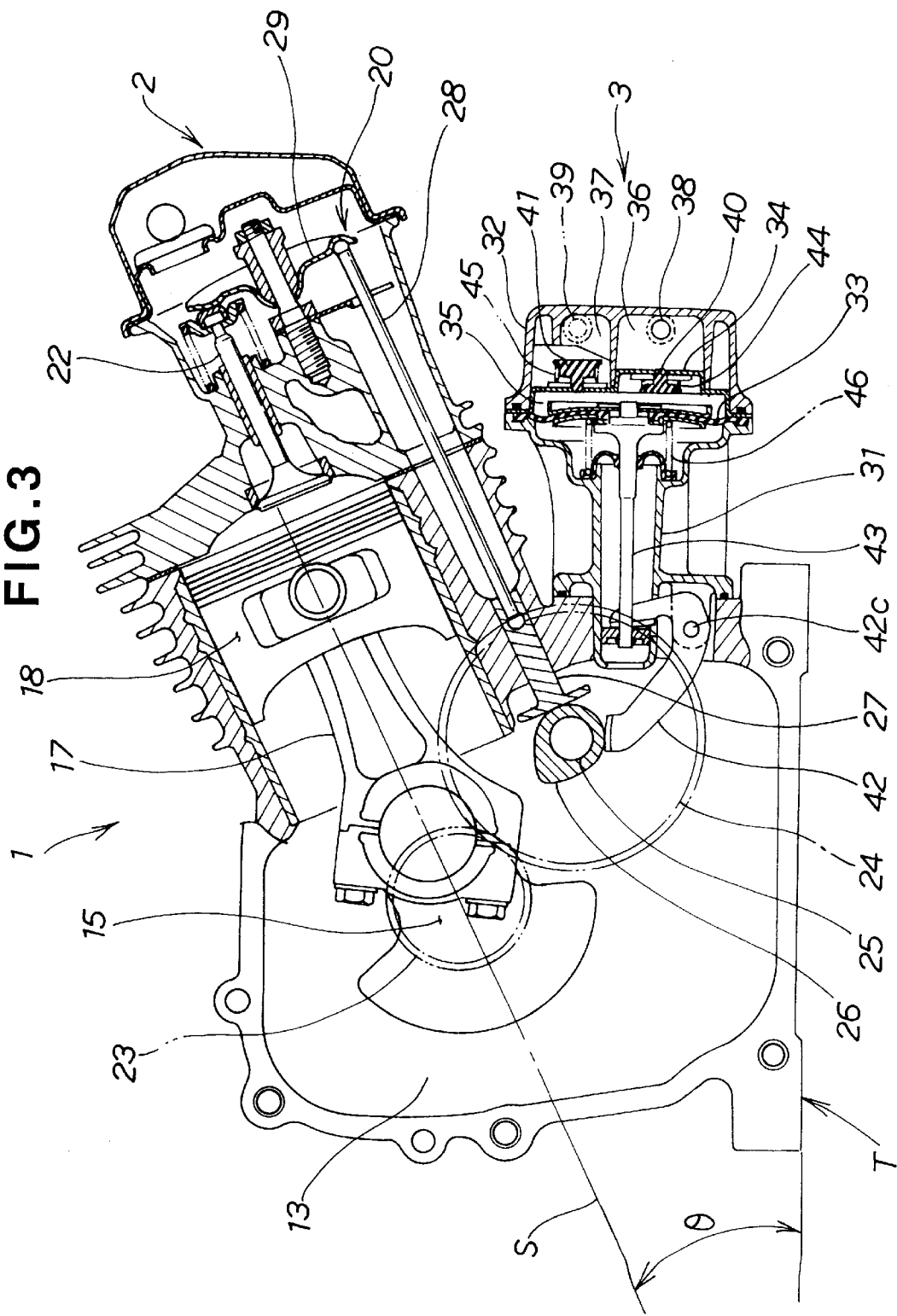
FIG. 3 is an enlarged sectional view taken along line 3—3 of FIG. 1.

FIG. 3 shows a piston 18 mounted to the crankcase 15 via a connecting rod 17, and a valve actuating mechanism 20 driven by the crankshaft 15.

Figure 5:
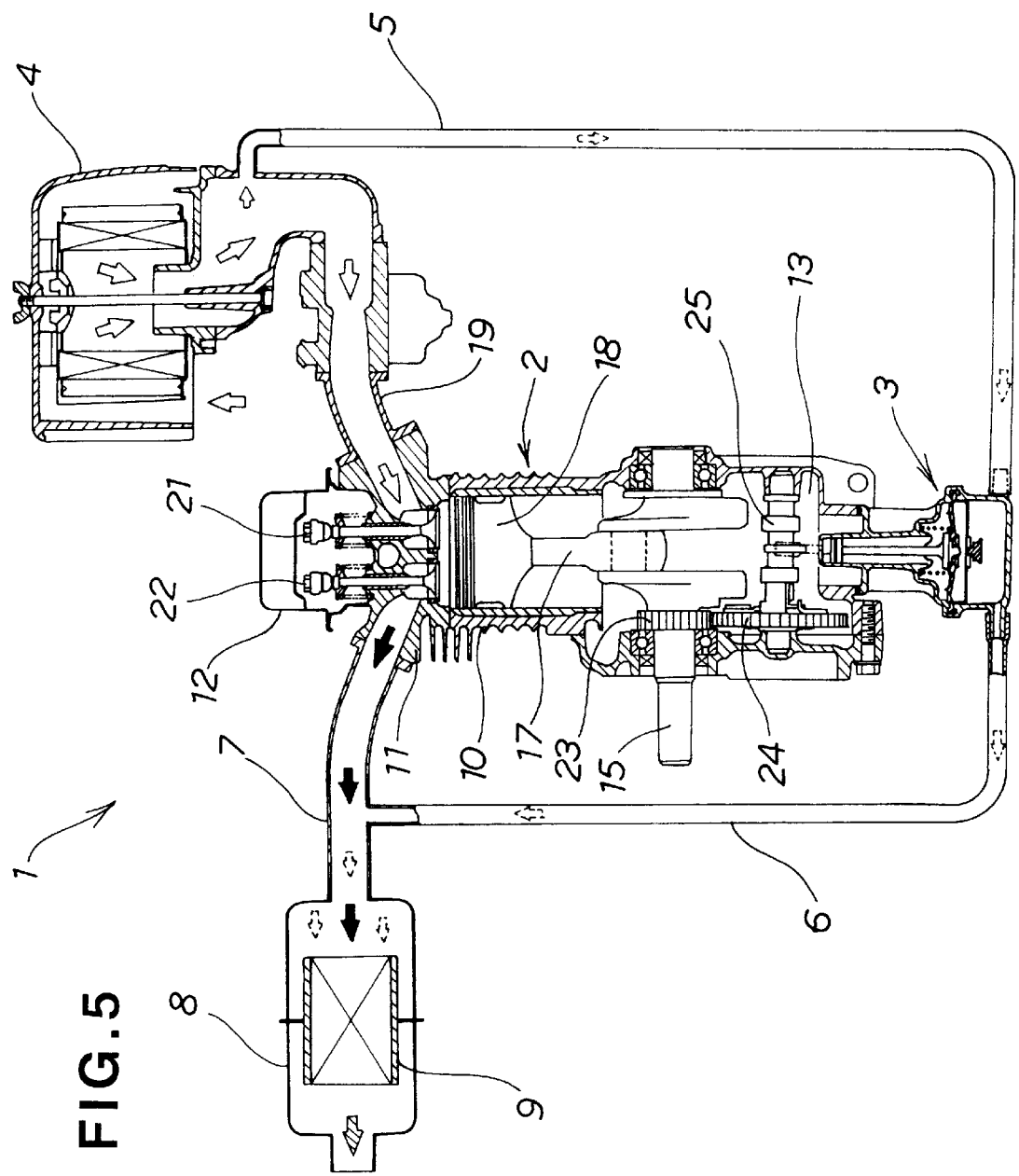
FIG. 5 shows an exhaust emission control system for the general-purpose internal combustion engine shown in FIG. 3.

As shown in FIG. 3, the valve actuating mechanism 20 is provided for opening and closing an exhaust valve 22 and an intake valve 21 (see FIG. 5). The valve actuating mechanism 20 comprises a crank gear 23 attached to the crankshaft 15, a cam gear 24 for meshing with the crank gear 23, a camshaft 25 rotated by the cam gear 24, an exhaust valve push rod 28 movable longitudinally of the inclined cylinder 2 by a cam 26 of the camshaft 25 through a tappet 27, and an exhaust valve rocker arm 29 actuated by the movement of the push rod 28 to open and close the exhaust valve 22.

The inclined cylinder 2 has an axis S inclined θ degree relative to a bottom surface T of the internal combustion engine 1.

The air pump 3 disposed sidewardly of the inclined cylinder 2 is actuated by the camshaft 25 serving as a drive source thereof. The air pump 3 is provided with a frame 31 having one end attached to the crankcase 13. The frame 31 has an opposite end attached to a casing 32. The frame 31 and the casing 32 are separated from each other by a diaphragm 33 and a partition plate 34. The diaphragm 33 and the partition plate 34 jointly define a pump chamber 35 therebetween. The partition plate 34 and the casing 32 jointly define an intake chamber 36 and an exhaust chamber 37 therebetween. The intake chamber 36 communicates with an intake nozzle 38 while the exhaust chamber 37 communicates with a discharge nozzle 39. An intake valve 40 opens and closes to bring the pump chamber 35 into and out of communication with the intake chamber 36.

Likewise, a discharge valve 41 opens and closes to bring the pump chamber 35 into and out of communication with the exhaust chamber 37. Rotation of the cam 26 causes a pump rocker arm 42 to pivot about a pin 42c. The cam 26 having the camshaft 25 and the pump rocker arm 42 jointly constructs a drive mechanism for actuating the air pump 3. Inside the frame 31, there is provided a pump shaft 43 having one end connected to the diaphragm 33 such that it can be moved longitudinally of the frame 31 by the pivotal movement of the pump rocker arm 42. Reference numerals 44, 45, 46 designate return springs.

The inclined cylinder 2 occupies a substantial space of the general-purpose internal combustion engine 1 and thus forms a dominant part thereof. In contrast, the air pump 3 is small in size and hence the amount of air taken in and out of the air pump 3 is very small compared to that of the inclined cylinder 2. Therefore, the air pump 3 can be disposed in a space provided by inclining the inclined cylinder 2, thereby preventing the overall configuration of the general-purpose internal engine from becoming large.

Next, operation of the air pump 3 will be described with reference to FIGS. 4A, 4B, and 4C.

FIG. 4A shows the operation of the air pump 3 during intake stroke. As the camshaft 25 rotates to simultaneously turn the cam 26 in a direction as indicated by arrow (1), the cam 26 depresses one end 42a of the pump rocker arm 42. The pump rocker arm 42 is then turned on the pin 42c in a direction as shown by arrow (2), thereby pulling the diaphragm 33 in a direction as indicated by arrow (3) by means of the pump shaft 43. For this reason, the pump chamber 35 becomes smaller in pressure than the intake chamber 36 to thereby open the intake valve 40. Since the intake valve 40 is thus opened, air is taken in through the intake nozzle 38 into the intake chamber 36 and subsequently flows through such an intake chamber 36 into the pump chamber 35, whereupon the discharge valve 41 remains closed.

FIG. 4B shows the air pump 3 placed in a condition between intake and exhaust strokes of the air pump 3.

One end 42a of the pump rocker arm 42 is placed at a lowermost position upon abutment against a top portion 26a of the cam 26. In this condition, the pump shaft 43 and the diaphragm 33 pulled by the other end 42b of the pump rocker arm 42 thus turned are placed at a backmost position. The return spring 46 remains compressed then. As a result, the capacity of the pump chamber 35 becomes maximum to complete the intake stroke, thereby providing a condition just before the exhaust stroke. The intake valve 40 is closed by the return spring 44 and the discharge valve 41 is likewise closed.

FIG. 4C shows the air pump 3 in an exhaust stroke. As the cam 26 rotates together with the camshaft 25 in the direction shown by arrow (1), the pump shaft 43 is shifted by return action of the return spring 46 in a direction as shown by arrow (5), thereby turning the pump rocker arm 42 in a direction indicated by arrow (4). Then, the one end 42a of the pump rocker arm 42 abutting against the cam 26 is moved upwardly back into a position as shown in FIG. 4A.

The movement of the diaphragm 33 in the direction shown by arrow (5) increases the pressure in the pump chamber 35 to thereby open the discharge valve 41. Thereafter, the air flows from the pump chamber 35 through the exhaust chamber 37 and out of the discharge nozzle 39. The intake valve 40 keeps closed.

As is apparent from the foregoing description, the air pump 3 of the present invention is designed to such intake and discharge a secondary air with the rotation of the camshaft 25. This means that the air pump 3 operates in synchronism with the exhaust valve 22 (see FIG. 3) opened and closed by means of the camshaft 25. Consequently, it is not necessary to provide a control system for controlling the air pump 3.

FIG. 5 illustrates an exhaust emission control system for the general-purpose internal combustion engine according to the present invention. The general-purpose internal combustion engine 1 sucks an air through the air cleaner 4, an intake pipe 19 and the intake valve 21 into the inclined cylinder 2 during an intake stroke, as shown by open or white arrows. Thereafter, the engine 1 discharges the air through the exhaust valve 22, the exhaust pipe 7, the muffler 8 and the ternary catalyst 9 during an exhaust stroke subsequent to compression and explosion strokes thereof, as indicated by solid or black arrows.

In the exhaust emission control system embodied in the general-purpose internal combustion engine 1, the air pump 3 sucks an air passed through the air cleaner 4 thereinto by means of the secondary air intake pipe 5 and thereafter supplies such an air (hereinafter referred to as a secondary air and shown by broken-lined arrows) to the exhaust pipe 7 via the secondary air supply pipe 6. After flown through the exhaust pipe 7, the secondary air makes contact with the ternary catalyst 9 provided inside the muffler 8 to thereby oxidize the exhaust emission or gas placed in contact with the ternary catalyst 9, whereby the exhaust emission control efficiency is improved.

Since the secondary air is thus fed into the muffler 8 by the air pump 3, the ternary catalyst 9 is supplied with a sufficient air, whereby the exhaust emission control is performed effectively throughout a wide range of engine speeds.

Figure 6A:
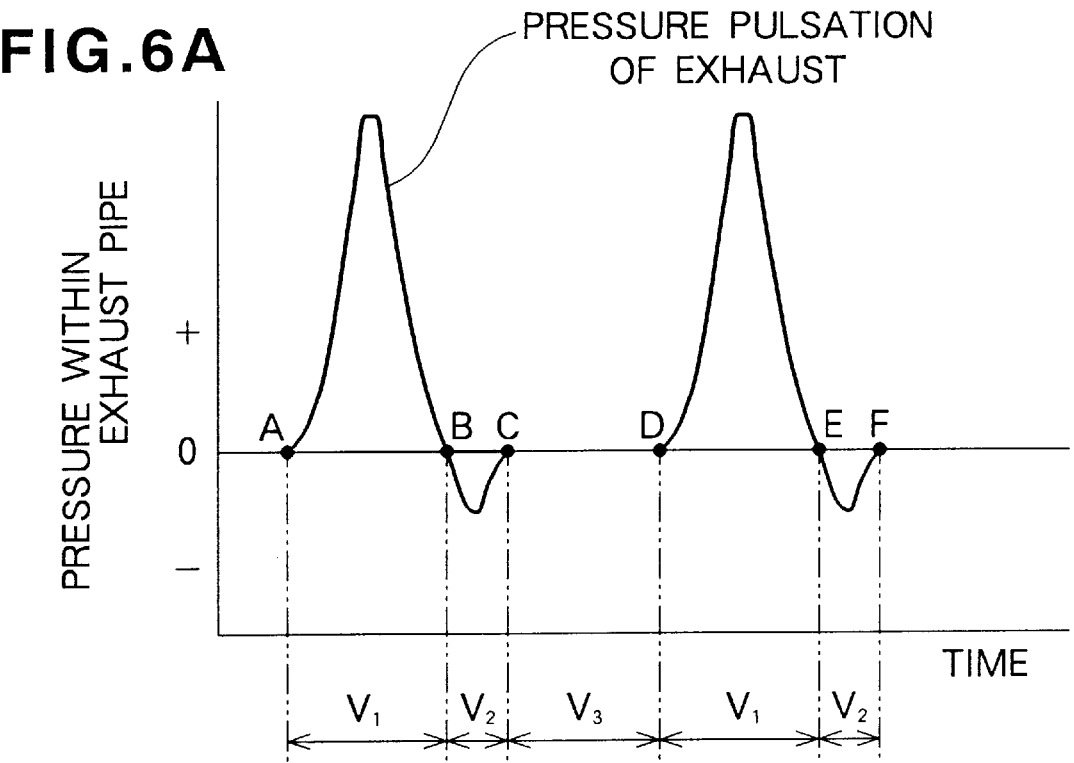
FIGS. 6A and 6B graphically show the relationships between the pressure in an exhaust pipe and the amount of air in the air pump.
Figure 6B:
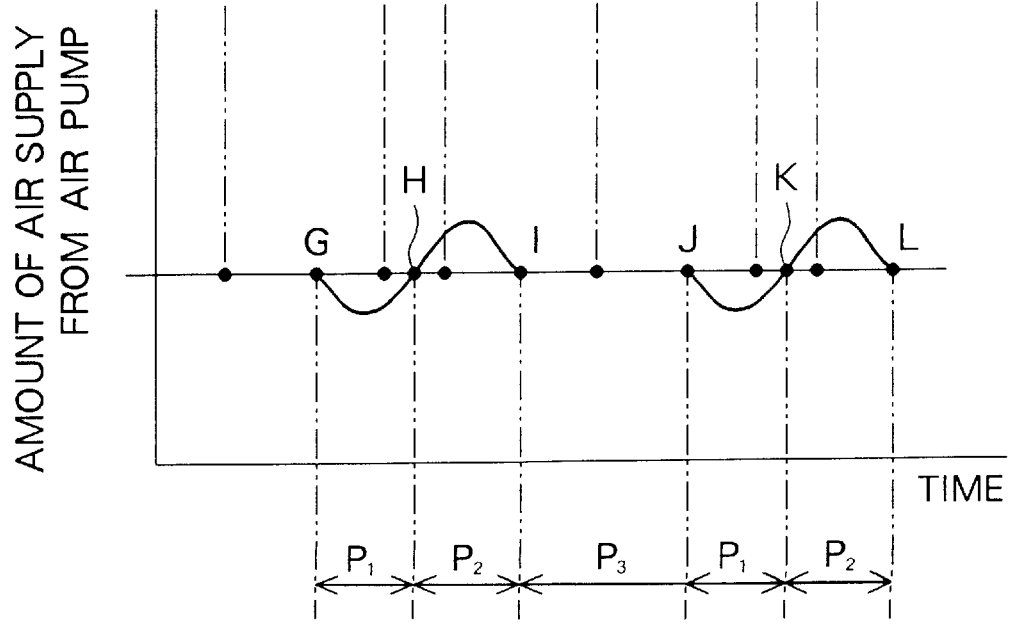

Reference is made to FIGS. 6A and 6B which graphically show relations between the pressure in the exhaust pipe 7 and the amount of air in the air pump 3.

FIG. 6A is a graph showing the pressure pulsation of the exhaust in the exhaust pipe 7 with time given on the horizontal axis and pressure (gauge pressure) on the vertical axis.

In FIG. 6A, reference character A shows a point in time at which the exhaust valve 22 commences opening. Designated by reference character B is a point in time at which the exhaust valve 22 is completely closed. Reference character C is a point in time at which the pulsation of the exhaust is finished. Reference character D denotes a point in time at which the exhaust valve 22 commences opening again. A point E shows a time when the exhaust valve 22 is completely closed. A point F denotes a time when the pulsation of the exhaust is completed. As can be appreciated from the graph, a pressure in the exhaust pipe 7 is positive for periods V1 between points A and B, and between points D and E. On the other hand, a pressure in the exhaust pipe 7 is negative for periods V2 between points B and C, and between points E and F. For a period V3 between points C and D, the pressure in the exhaust pipe 7 is equal to the atmospheric pressure.

FIG. 6B is a graph showing the amount of air taken in and out of the air pump 3 with tine given on the horizontal axis and the amount of air in the air pump 3 given on the vertical axis.

In FIG. 6B, reference character G represents a point in time at which the intake valve 41 begins opening. Reference character H represents an intermediate point in time between the intake and exhaust strokes (point in time at which the one end 42a of the pump rocker arm 42 shown in FIG. 4B abuts against the top portion 26a of the cam 26). Designated by reference character I is a point in time at which the discharge valve 41 is completely closed. J denotes a point in time at which the intake valve 40 starts opening again. Point K shows an intermediate point in time between the intake and exhaust strokes (point in time at which the one end 42a of the pump rocker arm 42 shown in FIG. 4B abuts against the top portion 26a of the cam 26). Point L is a time when the discharge valve 41 is completely closed. The air pump 3 sucks a secondary air thereinto for periods P1 between the points G and H and between the points J and K. The secondary air is discharged from the air pump 3 during periods P2 between the points H and I and between the points K and L. The air pump 3 goes out of operation during a period P3 between the points I and J.

Because discharge period P2 of the air pump 3 coincides with the period V2 in which the pressure in the exhaust pipe 7 is negative and with V3 in which the pressure in the exhaust pipe 7 is the atmospheric pressure, the air pump 3 for supplying the secondary air to the exhaust pipe 7 may be one with a low pumping pressure. Since the air pump 3 is thus driven by the camshaft 25, it becomes unnecessary to provide a particular arrangement for controlling the air pump 3 and hence the secondary air can be opportunely supplied to the exhaust pipe 7 when required.

Figure 7:
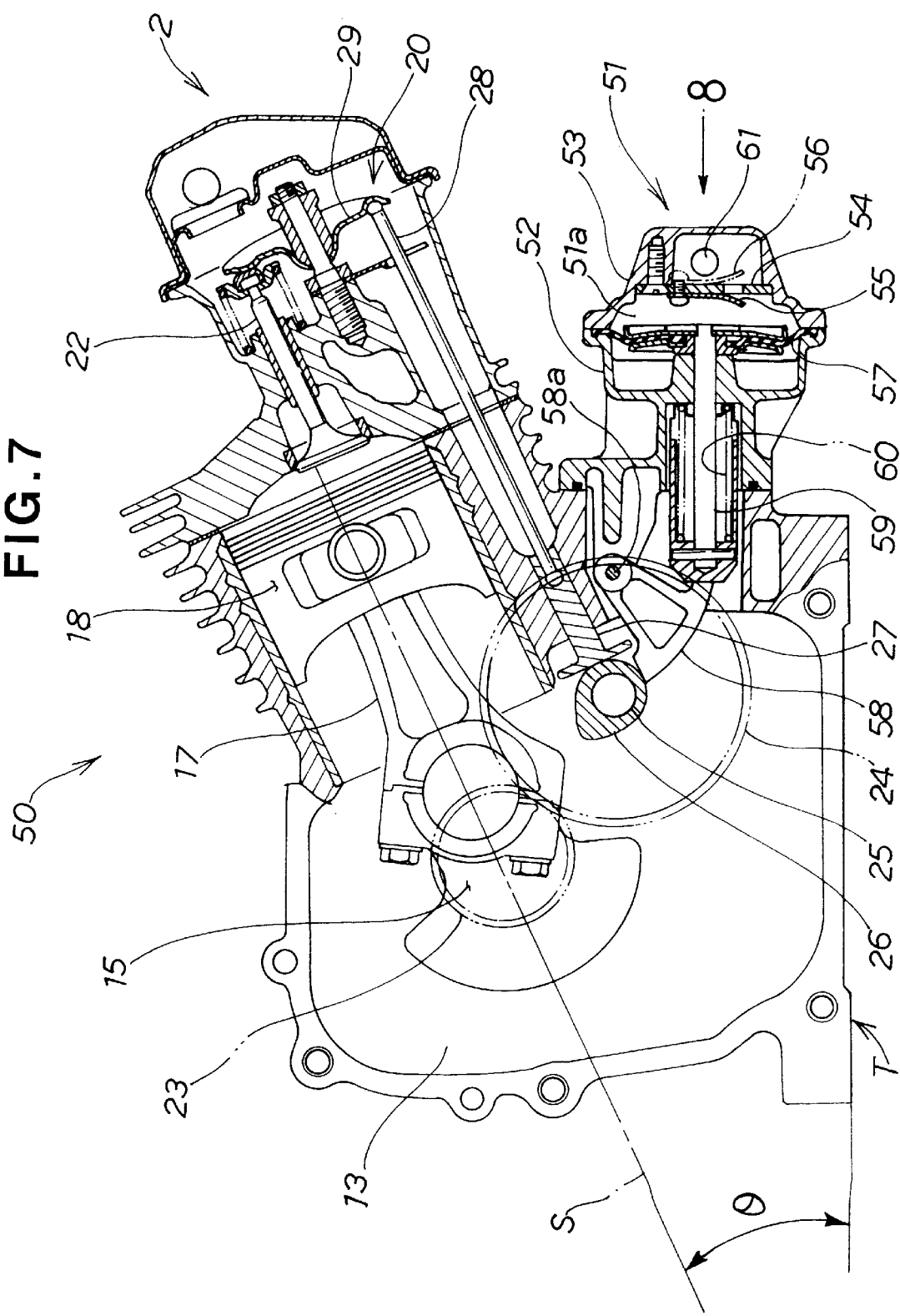
FIG. 7 is a sectional view similar to FIG. 3, showing a general-purpose internal combustion engine according to a second embodiment of the present invention.

FIG. 7 is a view similar to FIG. 3 but illustrating, in section, a second embodiment of the general-purpose engine.

As shown in FIG. 7, since a general-purpose internal combustion engine 50 according to the second embodiment is the same in construction as that of the first embodiment except for an air pump, the same reference numerals will be used for parts corresponding to those previously described with reference to FIGS. 1 to 6 and their description will be omitted.

The air pump 51 is driven by the camshaft 25 serving as a driving power source. In the air pump 51, a frame 52 is mounted to the crankcase 13 at its one end. The air pump 51 has a casing 53 attached to an opposite end of the frame 52. Within the casing 53, there is mounted a valve seat 54, which includes an intake lead valve 55 and a discharge lead valve 56. Between the frame 52 and the casing 53, there is provided a diaphragm 57. A pump rocker arm 58 having one end abutted with the cam 26 pivots about a pin 58a by the rotation of the cam 26. The cam 26 and the pump rocker arm 58 cooperates with each other to form a drive mechanism for operating the air pump 50. Within the frame 52, there is provided a pump shaft 59 movable longitudinally of the frame 52 by pivotal movement of the pump rocker arm 58. The pump shaft 59 has one end attached to a diaphragm 57. Reference numeral 60 represents a return spring.

The general-purpose internal combustion engine 50 is generally occupied by the inclined cylinder 2 forming a substantial part thereof. On the other hand, the amount of air taken in and out of the air pump 51 is very small compared to that of the inclined cylinder 2 and hence the air pump 51 is smaller in outer configuration than the inclined cylinder 2. Therefore, it becomes possible to accommodate the air pump 51 in a space provided by inclining the cylinder 2, whereby the overall outer configuration of the general-purpose internal engine 50 can be prevented from becoming large.

Figure 8:
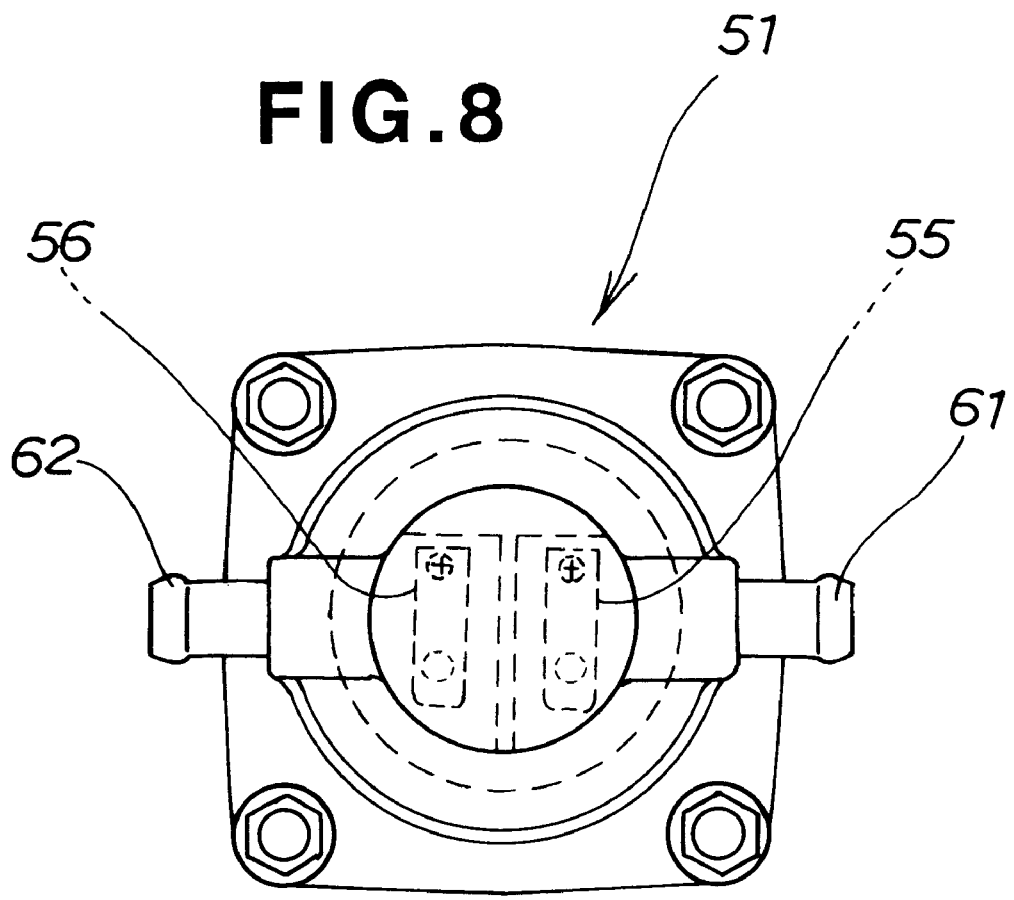
FIG. 8 is an enlarged view taken from the direction of arrow 8 of FIG. 7, showing an air pump of the internal combustion engine according to the second embodiment.

As shown in FIG. 8, the air pump 51 has an intake nozzle 61 and a discharge nozzle 62 positioned oppositely from the intake nozzle 61.

Operation of the air pump 51 will now be described with reference to FIG. 7.

Rotation of the cam 26 mounted on the camshaft 2 causes the pump rocker arm 58 to pivot about the pin 58a, thereby moving the diaphragm 57 back and forth by means of the pump shaft 59 with the result that the air pump 51 is operated to pump air. As the diaphragm 57 moves backward, the intake lead valve 55 is opened to introduce an air into a pump chamber 51a through the intake nozzle 61. On the other hand, the forward movement of the diaphragm 57 opens the discharge lead valve 56, whereby the air in the pump chamber 51a is discharged from the discharge nozzle 62 (see FIG. 8).

As can be appreciated from the foregoing description, the inventive air pump 50 operates in synchronism with the exhaust valve 22 (see FIG. 7) opened and closed by means of the camshaft 25. Consequently, it become unnecessary to provide a control system for controlling the air pump 50.

Figure 9:
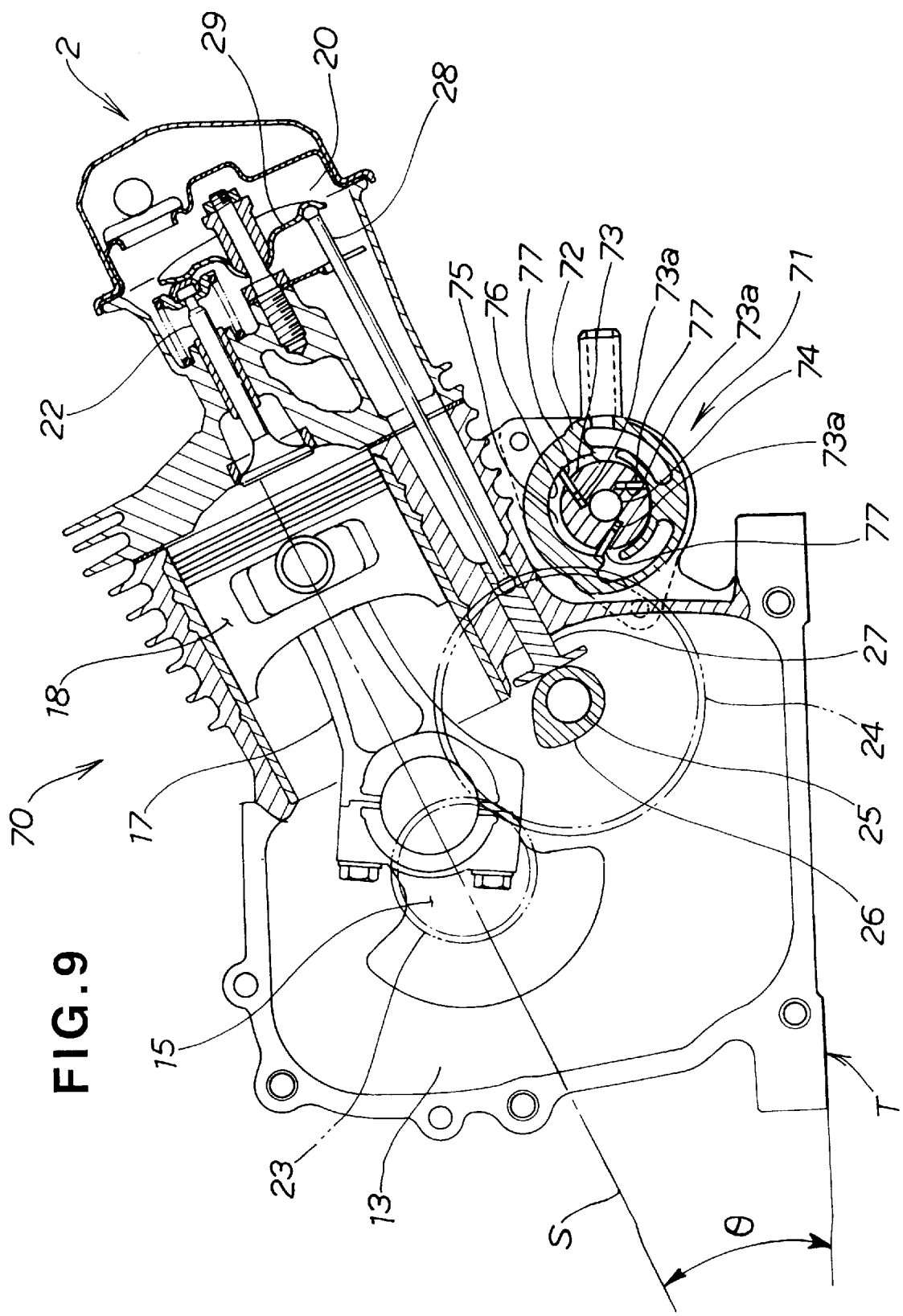
FIG. 9 is a sectional view of a general-purpose internal combustion engine according to a third embodiment of the present invention.

With reference to FIG. 9, there is shown a general-purpose internal combustion engine according to a third embodiment of the present invention. As the general-purpose internal combustion engine 70 has the same arrangement as that of the first embodiment except for an air pump, the same reference numerals will be used for parts corresponding to those of the embodiment of FIGS. 1 to 6 and their description will be omitted.

As illustrated in FIG. 9, an air pump 71 is a so-called vane pump driven by the camshaft 25 serving as a driving power source. The air pump 71 comprises a casing 72, a rotor 73 rotatable within the casing 72 and a pump shaft 74 for rotating the rotor 73.

The casing 72 has a circular eccentric space 75 provided internally thereof. An internal circumference 76 of the casing 72 defines an outer circumference of the eccentric space 75. The rotor 73 forms therein a plurality of grooves 73a extending obliquely inwardly from an outer circumference thereof. The grooves 73a are formed equidistantly. Sliding plates 77 are slidably inserted into the respective grooves 73a. By rotation of the rotor 73, an end of each sliding plate 77 is brought into abutment against the inner circumference 76.

Figure 10:
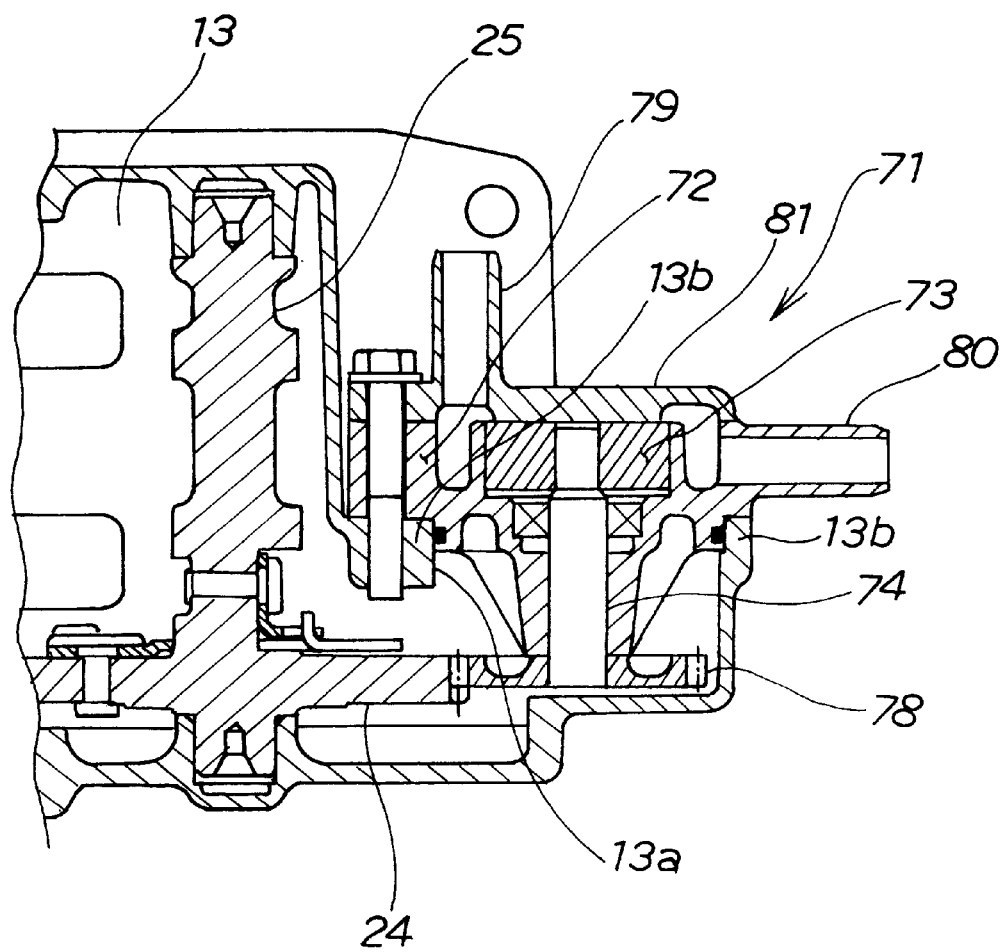
FIG. 10 is a transverse section of an air pump of the third embodiment shown in FIG. 9.

Reference is made to FIG. 10 which illustrates, in section, a relation between the camshaft and the air pump shown in FIG. 9.

Inside the crankcase 13, there is formed an opening 13a substantially parallel to the camshaft 25. An outer periphery of the opening 13a is defined by a flange 13b, to which the air pump 71 is attached by a bolt.

The rotor 73 is attached to one end of the pump shaft 74. On an opposite end of the pump shaft 74, there is mounted a pump driven gear 78. The driven gear 78 is meshed with a cam gear 24 having the camshaft 25. The gear 24 and the driven gear 78 cooperate with each other to constitute a drive mechanism for rotating the pump shaft 74. The gear 24 meshes with the crank gear 23 driven by the crankshaft 15, as shown in FIG. 9. Thus, the motion of the crankshaft 15 brings the rotor 73 into rotation by means of the crank gear 23, the gear 24, the pump driven gear 78 and the pump shaft 74. Reference numeral 79 designates an intake nozzle; 80, a discharge nozzle; and 81, a lid.

Referring back to FIG. 9, the general-purpose internal combustion engine 70 is substantially occupied by the inclined cylinder 2 forming a dominant part thereof. On the other hand, the amount of air taken into and out from the air pump 71 is very small compared to that of the inclined cylinder 2 and hence the air pump 51 may be made small in outer configuration. Accordingly, the air pump 71 can be accommodated in a space provided by inclining the cylinder 2 with the result that the general-purpose internal engine 70 is not generally made large in outer configuration.

In FIG. 9, the rotor 73 is rotated counterclockwise by the crankshaft 15 serving as a driving power source of the air pump 71 through the gear 24 and the pump driven gear 78, whereby the air pump 71 of the third embodiment is operated to alternately repeat intake and discharge of air between the adjacent sliding plates 77 provided in the rotor 73.

It will be appreciated that the air pump 71 of the third embodiment operates in synchronism with the exhaust valve 22 opened and closed by means of the camshaft 25 mounted on the gear 24. As a result, a control system for controlling the air pump 70 is not needed.

Obviously, various minor changes and modifications of the present invention are possible in the light of the above teaching. It is therefore to be understood that within the scope of the appended claims, the present invention may be practiced otherwise than as specifically described.

What is claimed is:

1. An exhaust emission control apparatus for a general-purpose internal combustion engine, comprising:

an exhaust passage for guiding an exhaust emission produced by operation of said internal combustion engine externally thereof;

a ternary catalyst provided in said exhaust passage;

an air pump for forcibly supplying said ternary catalyst with a secondary air for controlling the exhaust emission; and a drive mechanism for driving said air pump in synchronism with opening and closing motions of an exhaust valve of said internal combustion engine.

2. An exhaust emission control apparatus according to claim 1, wherein said drive mechanism comprises a camshaft for driving said exhaust valve.

3. An exhaust emission control apparatus according to claim 2, wherein said drive mechanism includes a pump rocker arm having an end abutted with a cam provided on said camshaft for opening and closing said exhaust valve and an opposite end connected to one end of a pump shaft of said air pump, said pump rocker arm being pivotable about a pin by rotation of said cam.

4. An exhaust emission control apparatus according to claim 1, wherein said drive mechanism includes a cam gear having a camshaft for actuating said exhaust valve.

5. An exhaust emission control apparatus according to claim 4, wherein said drive mechanism includes a pump driven gear meshing with said cam gear so that a pump shaft mounted on said pump driven gear can be rotated by the rotation of said cam gear.

* * * * *